US012655671B2

(12) United States Patent
Tanaka et al.

(10) Patent No.: US 12,655,671 B2
(45) Date of Patent: Jun. 16, 2026

(54) OPENING AND CLOSING BODY CONTROL DEVICE

(71) Applicant: U-SHIN LTD., Nagano (JP)

(72) Inventors: Masatoshi Tanaka, Hiroshima (JP); Etsuro Watanabe, Hiroshima (JP)

(73) Assignee: U-SHIN LTD., Nagano (JP)

( * ) Notice: Subject to any disclaimer, the term of this patent is extended or adjusted under 35 U.S.C. 154(b) by 211 days.

(21) Appl. No.: 18/469,839

(22) Filed: Sep. 19, 2023

(65) Prior Publication Data

US 2024/0117664 A1 Apr. 11, 2024

(30) Foreign Application Priority Data

Oct. 7, 2022 (JP) ................................ 2022-162467

(51) Int. Cl.
*E05F 15/42* (2015.01)

(52) U.S. Cl.
CPC ........... *E05F 15/42* (2015.01); *E05Y 2400/44* (2013.01); *E05Y 2900/532* (2013.01)

(58) Field of Classification Search
CPC ........ E05F 1/00; E05F 15/42; E05Y 2400/44; E05Y 2900/532
USPC ........................................................... 701/49
See application file for complete search history.

(56) References Cited

U.S. PATENT DOCUMENTS

| | | | | |
|---|---|---|---|---|
| 11,459,813 | B2 * | 10/2022 | Tokudome | E05F 15/73 |
| 2020/0198634 | A1 * | 6/2020 | Yashiro | G08G 1/16 |
| 2020/0291706 | A1 * | 9/2020 | Kimura | E05F 15/40 |
| 2022/0056752 | A1 * | 2/2022 | An | E05F 15/76 |
| 2022/0340101 | A1 * | 10/2022 | Kaster | G08B 21/02 |

FOREIGN PATENT DOCUMENTS

| | | | |
|---|---|---|---|
| JP | 2009-108556 | A | 5/2009 |
| JP | 2010-196377 | A | 9/2010 |
| JP | 2012-207382 | A | 10/2012 |
| JP | 2017-149212 | A | 8/2017 |

* cited by examiner

*Primary Examiner* — Erin M Piateski
*Assistant Examiner* — David Mesquiti Ovalle
(74) *Attorney, Agent, or Firm* — Chrisman Gallo Tochtrop LLC

(57) ABSTRACT

An opening and closing body control device includes a distance detection unit that detects a detection distance, which is a distance to a detected object around an opening and closing body, and a control unit. When a start command is input, the control unit determines whether the detected object is a moving object or a stationary object, sets a first or second collision determination distance as a collision determination distance depending on whether the detected object is moving or stationary. When the detection distance is smaller than the collision determination distance, the control unit controls the drive unit to stop operation of the opening and closing body.

14 Claims, 11 Drawing Sheets

OPENING AND CLOSING BODY CONTROL DEVICE

CROSS-REFERENCE TO RELATED APPLICATION

This application claims benefit of priority to Japanese Patent Application No. 2022-162467, filed on Oct. 7, 2022, the entire context of which is incorporated herein by reference.

TECHNICAL FIELD

The present invention relates to an opening and closing body control device.

BACKGROUND ART

JP 2009-108556 A discloses a control device that opens a vehicle back door from a closed position to an open position by operation of a motor. The back door is provided with an obstacle sensor. When the obstacle sensor detects an obstacle during opening operation of the back door, the control device stops operation of the motor and thus the opening operation of the back door so as to avoid collision between the back door and the obstacle.

SUMMARY

In a case where the obstacle is a moving object (for example, a user of a vehicle) approaching toward the back door, stopping of the motor and the back door for the approaching moving object may be delayed, causing collision between the back door and the obstacle.

In view of the above, an object of the present invention is to prevent occurrence of collision of an opening and closing body such as a back door during operation of the opening and closing body.

A first aspect of the present invention provides an opening and closing body control device, including a drive unit that drives an opening and closing body that opens and closes an opening of a vehicle body, a distance detection unit that detects a detection distance that is a distance to a detected object around the opening and closing body, and a control unit that controls the drive unit to operate the opening and closing body when a start command of opening operation or closing operation of the opening and closing body is input, the control unit configured to: determine whether the detected object is a moving object or a stationary object based on a detection result of the distance detection unit when the start command is input; set a first collision determination distance as a collision determination distance to be compared with the detection distance in a case where the detected object is the stationary object; set a second collision determination distance longer than the first collision determination distance as the collision determination distance in a case where the detected object is the moving object; and control the drive unit to continue operation of the opening and closing body when the detection distance is larger than the collision determination distance, and control the drive unit to stop operation of the opening and closing body when the detection distance is smaller than the collision determination distance.

According to the above configuration, when the detection distance as a distance to the detected object is smaller than the collision determination distance set by the control unit, operation of the opening and closing body stops. In a case where the detected object is a stationary object, the control unit sets the first collision determination distance as the collision determination distance, and in a case where the detected object is a moving object, the control unit sets the second collision determination distance as the collision determination distance. The second collision determination distance is longer than the first collision determination distance. Therefore, in a case where the detected object is a moving object, operation of the opening and closing body is stopped even if the detected object is present at a farther position. Therefore, the opening and closing body can be stopped before the detected object is too close to the opening and closing body, and occurrence of collision of the opening and closing body can be prevented even if the detected object is a moving object.

According to the present invention, it is possible to prevent occurrence of collision of an opening and closing body during operation of the opening and closing body.

DETAILED DESCRIPTION

Figure 1:
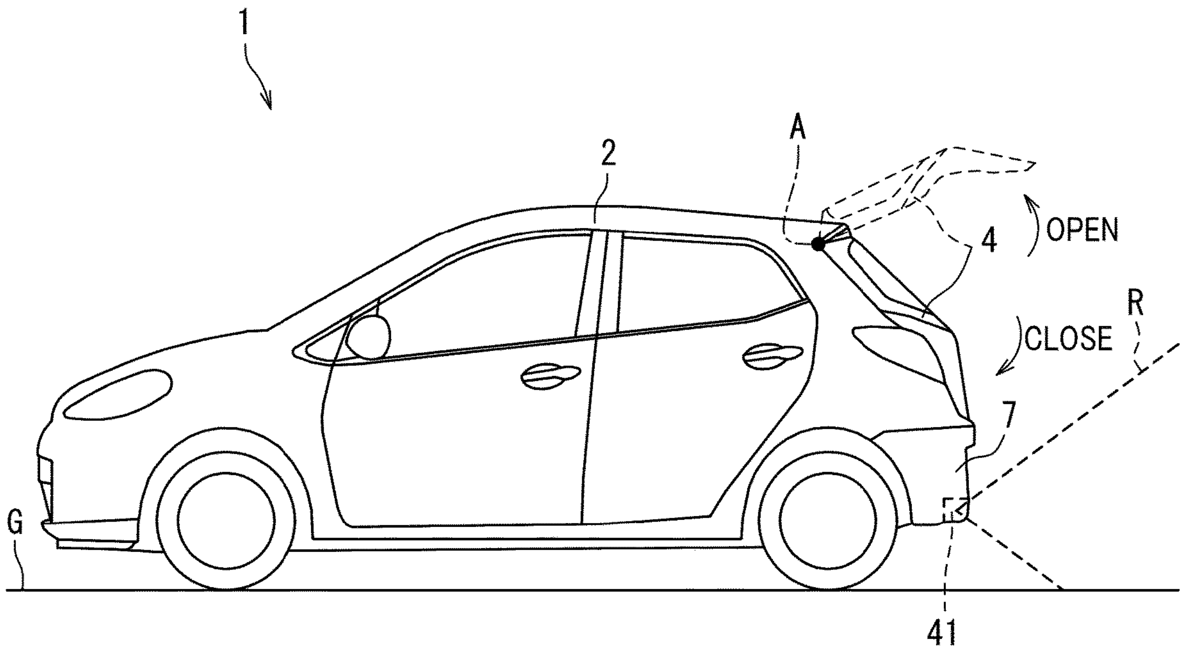
FIG. 1 is a left side view illustrating a vehicle on which an opening and closing body control device according to a first embodiment is mounted.

Hereinafter, an embodiment of the present invention will be described with reference to the accompanying drawings. Note that the same or corresponding elements are denoted by the same reference numerals throughout the drawings, and overlapping of detailed description will be omitted. Further, unless otherwise specified, it is assumed that the ground on which a vehicle is grounded is horizontal, but a direction in description below can be appropriately changed according to a gradient of the ground.

First Embodiment

Figure 2:
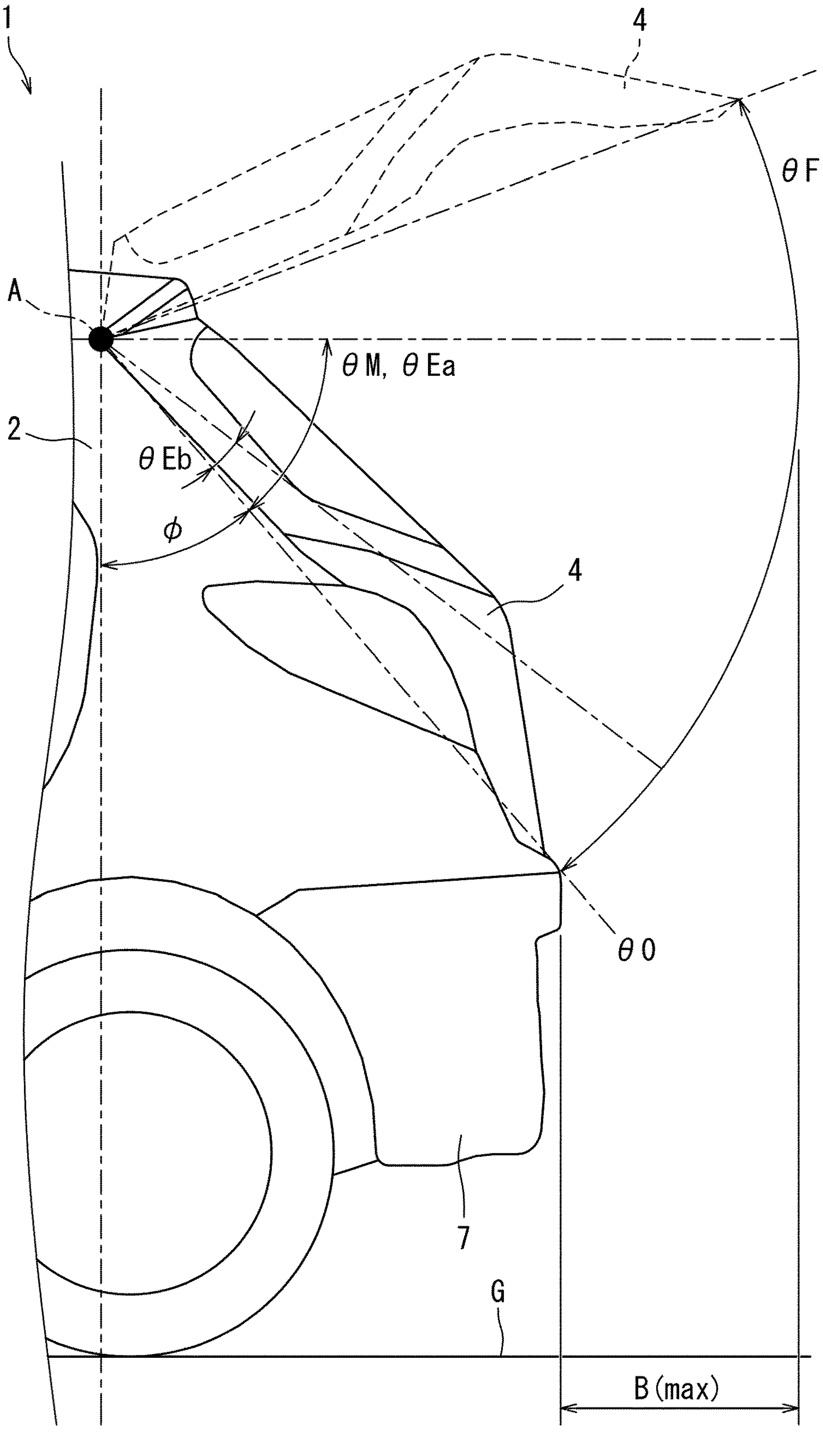
FIG. 2 is a partially enlarged view of FIG. 1.
Figure 3:
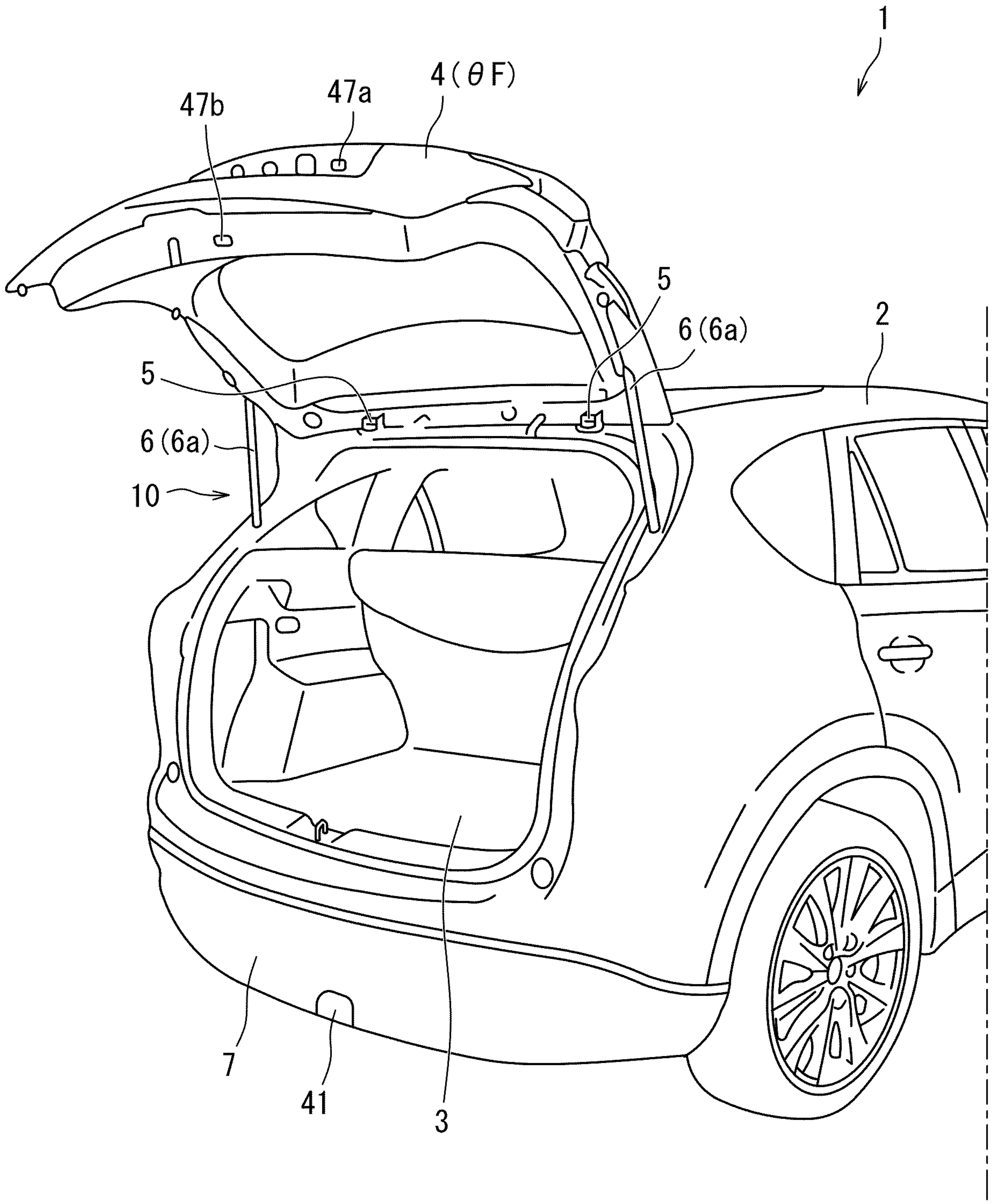
FIG. 3 is a perspective view illustrating a rear portion of the vehicle illustrated in FIG. 1.

Referring to FIGS. 1 to 3, an opening and closing body control device 100 according to the present embodiment controls opening operation and closing operation of an opening and closing body provided in a vehicle 1 such as a four-wheeled vehicle. The vehicle 1 includes, as an example of the opening and closing body, a back door 4 that opens and closes an opening 3 provided at a rear portion of the vehicle body 2. The back door 4 operates so as to change its operation position within a movable range between a fully closed position θ0 (see a solid line in FIGS. 1 and 2) for closing the opening 3 and a fully open position θF (see a broken line in FIGS. 1 and 2) for opening the opening 3.

A fully closed state is a state in which the back door 4 is positioned at the fully closed position θ0. As illustrated in FIG. 3, a fully open state is a state in which the back door 4 is positioned at the fully open position θF. Opening operation is operation in an opening direction toward the fully open position θF, and once started, the opening operation is naturally continued to the fully open state. Closing operation is operation in a closing direction toward the fully closed position θ0, and once started, the closing operation is naturally continued to the fully closed state. The opening operation typically starts in the fully closed state and the closing operation typically starts in the fully open state.

The back door 4 is attached to an upper edge of the opening 3 via a hinge 5 so as to be rotatable about an axis A extending in a vehicle width direction. In this case, the opening direction is counterclockwise in a left side view, and an operation position of the back door 4 can be quantitatively expressed by a rotation angle (deg) around the axis A.

In the fully closed state, the back door 4 is inclined more to the back as it goes to the lower side from the axis A. When the back door 4 is operated in the opening direction from the fully closed position θ0, an overhanging amount B of the back door 4 from the vehicle body 2 increases. Note that the overhanging amount B is a distance in a vehicle length direction from a rearmost end surface of the vehicle body 2 to the front end of the back door 4. In a state where the back door 4 is positioned at a maximum overhanging position OM between the fully closed position θ0 and the fully open position θF, the back door 4 extends parallel to the ground G from the axis A, and the overhanging amount B is maximum within a movable range of the back door 4. The back door 4 can further move in the opening direction from the maximum overhanging position OM to the fully open position θF. By the above, the opening 3 is opened wider, and the overhanging amount B decreases.

Here, it is assumed that the fully closed position θ0 is 0 degrees as a minimum value or a reference value and the fully open position θF is a positive maximum value, and an angle value of the fully open position θF corresponds to a movable range of the back door 4. Merely by way of example, the fully open position θF or the movable range is about 73 degrees. An inclination angle φ of the back door 4 with respect to a ground orthogonal direction in the fully closed state is a complementary angle of the maximum overhanging position θM. Merely by way of example, the maximum overhanging position θM is about 54 degrees (the inclination angle φ is about 36 degrees).

Figure 4:
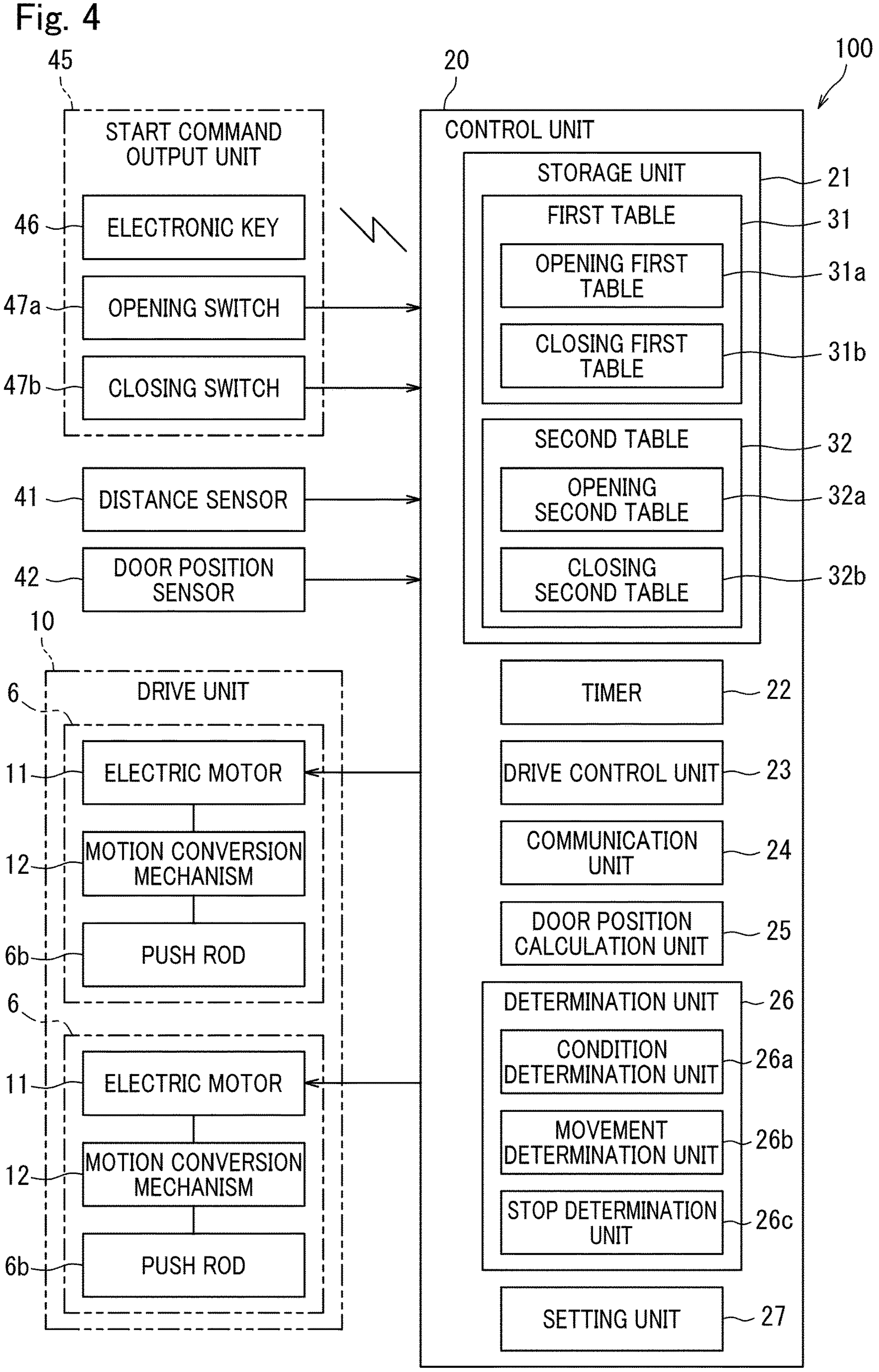
FIG. 4 is a block diagram schematically illustrating a configuration of the opening and closing body control device according to the first embodiment.
Figure 5:
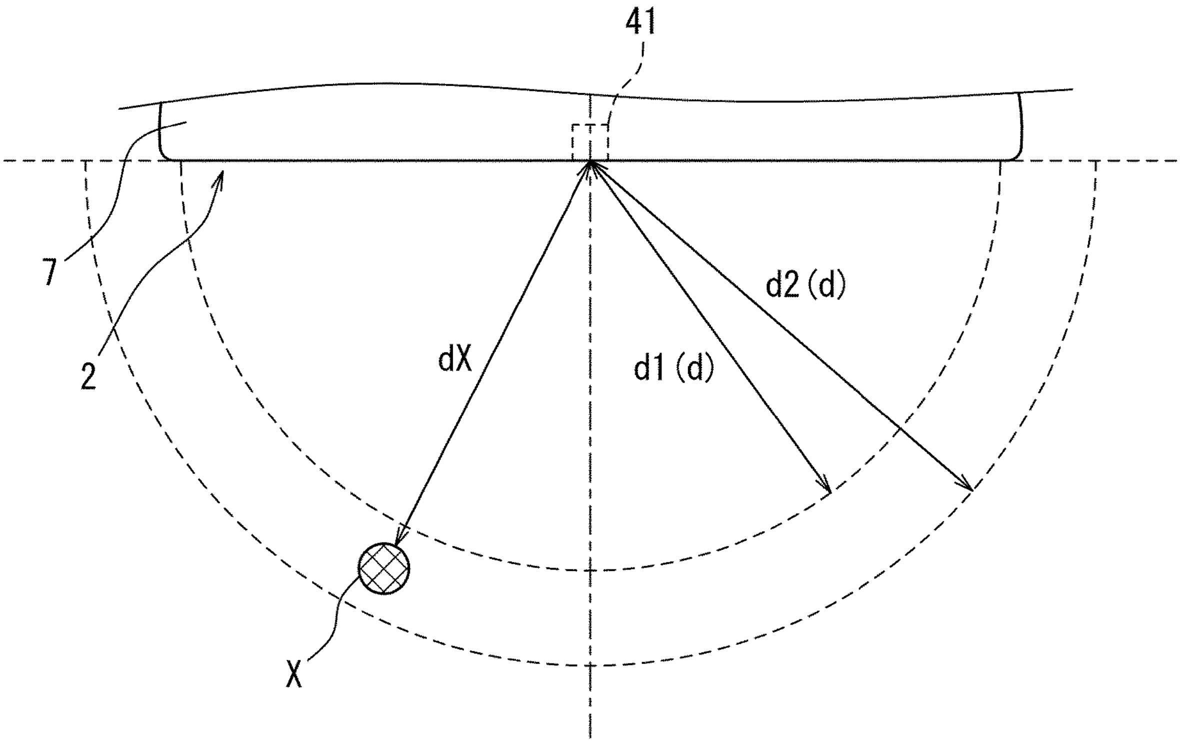
FIG. 5 is a plan view illustrating a distance sensor.

Referring to FIG. 4, the opening and closing body control device 100 includes a drive unit 10, a control unit 20, a distance sensor 41, and a door position sensor 42. The drive unit 10 drives the back door 4. As illustrated in FIG. 5 and the like, the distance sensor 41 detects a detection distance dB which is a distance to a detected object X around the back door 4. The door position sensor 42 detects an operation position of the back door 4.

The control unit 20 is constructed with hardware including a central processing unit (CPU), a memory including a random access memory (RAM) and a read only memory (ROM), and an input and output interface, and software mounted on the hardware. The CPU reads a program stored in advance in the memory, and executes information processing according to a step instructed by the program.

By the above, when a start command of the opening operation or the closing operation of the back door 4 is input, the control unit 20 controls the drive unit 10 to operate the back door 4. In order to avoid collision between the back door 4 and the detected object X during operation of the back door 4, the control unit 20 executes collision prevention processing of stopping the operation of the back door 4 according to at least the detection distance dX. In the present embodiment, in order to determine whether or not to continue operation of the back door 4 during execution of the collision prevention processing, an operation position of the back door 4 is also referred to together with the detection distance dX. For this reason, the control unit 20 is connected to a start command output unit 45, the drive unit 10, the distance sensor 41, and the door position sensor 42.

The start command output unit 45 includes an electronic key 46, an opening switch 47*a*, and a closing switch 47*b*. The electronic key 46 is carried by the user of the vehicle 1 and is configured to be able to wirelessly communicate with the control unit 20. The control unit 20 performs authentication processing of determining whether or not the electronic key 46 is proper by wirelessly communicating with the electronic key 46. The electronic key 46 may be provided with a button (not illustrated) for the user of the vehicle 1 to input a start command of operation of the back door 4. In this case, when the user operates the button, the electronic key 46 outputs a start command to the control unit 20. The electronic key 46 may be provided with two buttons so that the user can input a start command of the opening operation and a start command of the closing operation in a distinguishing manner. The opening switch 47*a* and the closing switch 47*b* are provided on an outer surface of the back door 4 (see FIG. 3). After the authentication processing is performed in a state where the user carries the electronic key 46, when the user operates the opening switch 47*a*, the opening switch 47*a* outputs a start command of the opening operation to the control unit 20. When the user operates the closing switch 47*b*, the closing switch 47*b* outputs a start command of the closing operation to the control unit 20. Note that the authentication processing may be performed after the user operates the opening switch 47*a* or the closing switch 47*b*.

The start command output unit 45 may be a part of a constituent of the opening and closing body control device 100 or may be a constituent outside the opening and closing body control device 100. When a start command is output from the start command output unit 45, the control unit 20 controls the drive unit 10.

Referring to FIGS. 3 and 4, the drive unit 10 includes, for example, a pair of spindle drive mechanisms 6. Each of the spindle drive mechanisms 6 has a cylindrical housing 6*a* and a push rod 6*b* inserted into the housing 6*a*, and connects the back door 4 to the vehicle body 2. A proximal end portion of the housing 6*a* is connected to a side edge portion of the opening 3, and a distal end portion of the push rod 6*b* is connected to an inner surface of the back door 4. Each of the spindle drive mechanisms 6 further includes an electric motor 11 and a motion conversion mechanism 12. The electric motor 11 is rotatable forward and backward. A screw pair is applied to the motion conversion mechanism 12. The electric motor 11 and the motion conversion mechanism 12 are incorporated in the housing 6*a*. When the electric motor 11 is activated, the motion conversion mechanism 12 converts a rotational driving force generated by the electric motor 11 into a linear motion and transmits the linear motion to the push rod 6*b*, and the push rod 6*b* extends or contracts along a central axis of the housing 6*a* according to a rotation direction of the electric motor 11. The back door 4 is lifted from the vehicle body 2 by extension of the push rod 6*b* and operates in the opening direction, and is attracted to the vehicle body 2 by contraction of the push rod 6*b* and operates in the closing direction.

Referring to FIGS. 1 and 5, the detection distance dX detected by the distance sensor 41 is a distance from the distance sensor 41 itself to the detected object X. In the present embodiment, the distance sensor 41 is attached not to the back door 4 but to the vehicle body 2 side. For this reason, a start point of the detection distance dX is not displaced when viewed from the vehicle body 2 regardless of an operation position of the back door 4. Since the opening operation and the closing operation of the back door 4 are performed while a vehicle is stopped in principle, a start point of the detection distance dX is not displaced even when viewed from the ground. Since the starting point is not displaced with respect to the vehicle body 2 and the ground, it can be said that the detection distance dX to a certain detected object X changes with a lapse of time only when the detected object X moves on the ground. For this reason, while the back door 4 is operating, it is easy to detect the detected object X moving so as to approach the vehicle body 2 on the ground.

In the present embodiment, the distance sensor 41 includes a single sensor. The distance sensor 41 is disposed at a single sensor mounting position set on a rear end surface of the vehicle 1. As an example, the sensor mounting position is set below a rear end surface of a rear bumper 7 provided below the opening 3 (that is, below the back door 4 in the fully closed state) and at a center position in the vehicle width direction. The distance sensor 41 detects a distance from a rear end surface of the vehicle 1 to the detected object X behind the vehicle 1 as the detection distance dX.

In the present embodiment, the distance sensor 41 is constituted by an ultrasonic sensor as an example. The ultrasonic sensor emits an ultrasonic wave rearward and forms one scanning range R extending in a conical shape rearward from the sensor mounting position. In a case where the detected object X is present within the scanning range R, the distance sensor 41 receives a reflected wave from the detected object X, and detects a linear distance from itself to the detected object X as the detection distance dX according to the principle of time of flight (TOF). The ultrasonic sensor is advantageous in that a color of the detected object X hardly affects detection accuracy and that the scanning range R is large.

Note that the principle of distance measurement used for the distance sensor 41 is not limited to TOF, and may be triangulation, for example. In this case, not only a linear distance from the vehicle body 2 to the detected object X but also its front-rear direction component can be measured. A medium emitted from the distance sensor 41 for forming the scanning range R is not limited to an ultrasonic wave, and may be, for example, laser light. The distance sensor 41 may include a plurality of sensors arranged at intervals in the vehicle width direction. In this case, a plurality of the scanning ranges R may be arranged in the vehicle width direction such that two adjacent ones of the scanning ranges R partially overlap each other.

Returning to FIG. 4, the door position sensor 42 does not necessarily need to be a sensor that detects an operation position itself of the back door 4 as long as the door position sensor 42 can detect information available for deriving or estimating the operation position. For example, the door position sensor 42 is constituted by an encoder attached to the electric motor 11. The encoder detects a rotation angle of the electric motor 11 and thus the number of rotations. When specifications of the back door 4 and the drive unit 10 are determined, a person skilled in the art related to the opening and closing body control device 100 can derive in advance a function indicating how much the back door 4 operates as how much the electric motor 11 rotates in light of geometry and mechanism. If the control unit 20 stores the function in advance, the control unit 20 can refer to the function stored in advance to arithmetically easily derive an operation position of the back door 4 on the basis of a detection result of the encoder.

The control unit 20 includes a storage unit 21, a timer 22, a drive control unit 23, a communication unit 24, a door position calculation unit 25, a determination unit 26, and a setting unit 27.

The storage unit 21 temporarily or permanently stores information necessary for controlling operation of the back door 4. As an example, the storage unit 21 stores a first table 31 and a second table 32 (see also FIGS. 7 and 8). The tables 31 and 32 will be described later.

The timer 22 measures time. The drive control unit 23 controls the electric motor 11 to operate or stop the drive unit 10 and thus the back door 4. The communication unit 24 transmits and receives information or a signal to and from the electronic key 46. The communication unit 24 receives a start command from the opening switch 47*a* and the closing switch 47*b*. The communication unit 24 functions as a start command receiving unit that receives a start command output from the start command output unit 45. The communication unit 24 receives a detection result of the distance sensor 41 and the door position sensor 42. The distance sensor 41 and the door position sensor 42 sequentially output detection results at a predetermined sampling period (for example, 5 msec).

In a case where the door position sensor 42 does not detect an operation position itself, the door position calculation unit 25 refers to an operation position calculation table (not illustrated) stored in advance in the storage unit 21, and calculates an operation position of the back door 4 on the basis of a detection result of the door position sensor 42. The operation position calculation table defines a correlation between a parameter (for example, an angle of rotation or the number of rotations of the electric motor 11) detected by the door position sensor 42 and an operation position of the back door 4.

The determination unit 26 performs various types of determination processing when operation of the back door 4 is controlled. The determination unit 26 includes, for example, a condition determination unit 26*a*, a movement determination unit 26*b*, and a stop determination unit 26*c*.

When a start command is received by the communication unit 24, the condition determination unit 26*a* determines whether a start condition of collision prevention processing for stopping operation of the back door 4 according to the detection distance dX is satisfied. Further, the condition determination unit 26*a* determines whether or not an end condition of the collision prevention processing is satisfied during execution of the collision prevention processing.

The start condition will be described with reference to FIGS. 6A and 6B after explanation of a "collision determination distance d". In the present embodiment, the end condition includes a condition that an operation position of the back door 4 reaches a predetermined end position between the fully closed position θ0 and the fully open position θF. The end position is set to a position immediately before operation is completed. Thus, an opening end position θEa applied during the opening operation is different from a closing end position θEb applied during the closing operation. The opening end position θEa is set near the fully open position θF. For example, the opening end position θEa is set to the maximum overhanging position θM. The closing end position θEb is set near the fully closed position θ0. For example, the closing end position θEb is approximately 12 degrees.

During execution of the collision prevention processing, the movement determination unit **26*b* determines whether the detected object X is a moving object or a stationary object based on detection results sequentially output from the distance sensor 41. In order to execute this determination processing, the storage unit 21 stores time series data of the detection distance dX sequentially received within a time window including a current time point. The movement determination unit 26*b* estimates an amount of displacement of the detected object X from a current value and a past value of the detection distance dX, and estimates a movement speed of the detected object X from a time difference between a current value and a past value and the amount of displacement. The movement determination unit 26*b* compares an estimated value of a moving speed with a predetermined movement determination threshold (for example, 10 mm/sec). The movement determination unit 26*b* determines that the detected object X is a moving object when the estimated value is the movement determination threshold or more, and determines that the detected object X is a stationary object when the estimated value is less than the movement determination threshold. Note that, although not illustrated, the storage unit 21** permanently stores the movement determination threshold.

The stop determination unit **26*c* compares the detection distance dX with the collision determination distance d during execution of the collision prevention processing. When the detection distance dX is larger than the collision determination distance d, the stop determination unit 26*c* determines that operation of the back door 4 can be continued. In response to this, the drive control unit 23 controls the drive unit 10 to continue operation of the back door 4. On the other hand, if the detection distance dX is smaller than the collision determination distance d, the stop determination unit 26*c* determines that operation of the back door 4 cannot be continued. In response to this, the drive control unit 23 controls the drive unit 10 to stop operation of the back door 4**.

The setting unit 27 sets the collision determination distance d to be compared with the detection distance dX in determination of whether or not operation of the back door 4 can be continued performed by the stop determination unit **26*c* during execution of the collision prevention processing. The collision determination distance d changes depending on whether the detected object X is a moving object or a stationary object. In a case where the detected object X is a stationary object, the setting unit 27 sets a "first collision determination distance d1" as the collision determination distance d to be compared with the detection distance dX. In a case where the detected object X is a moving object, the setting unit 27 sets a "second collision determination distance d2" as the collision determination distance d to be compared with the detection distance dX. As described above, the collision determination distance d includes the first collision determination distance d1 and the second collision determination distance d2. In a case where the first collision determination distance d1 and the second collision determination distance d2** are not particularly distinguished from each other (in other words, in a case where they are common to each other), the term "collision determination distance d" is used.

In the present embodiment, the collision determination distance d also changes depending on whether the opening operation or the closing operation is being performed. In the present embodiment, the collision determination distance d also changes according to an operation position of the back door 4. Under a situation where operation directions and operation positions of the back door 4 are the same, the second collision determination distance d2 is longer than the first collision determination distance d1.

The setting unit 27 variably sets the collision determination distance d in accordance with the situation as described above with reference to the tables 31 and 32 described above. The first table 31 is referred to for setting the first collision determination distance d1 as the collision determination distance d in a case where the detected object X is a stationary object, and defines a correspondence relationship between an operation position and the first collision determination distance d1. The second table 32 is referred to for setting the second collision determination distance d2 as the collision determination distance d in a case where the detected object X is a moving object, and defines a correspondence relationship between an operation position and the second collision determination distance d2.

The first table 31 includes an opening first table **31*a* referred to for setting the first collision determination distance d1 at the time of the opening operation and a closing first table 31*b* referred to for setting the first collision determination distance d1 at the time of the closing operation. The second table 32 includes an opening second table 32*a* referred to for setting the second collision determination distance d2 at the time of the opening operation and a closing second table 32*b* referred to for setting the second collision determination distance d2 at the time of the closing operation. Since the collision determination distance d is set by distinguishing two types of the detected objects X and distinguishing two types of operation directions, a total of four types of the tables 31*a*, 31*b*, 32*a*, and 32*b* are stored in the storage unit 21** in advance.

Figure 7:
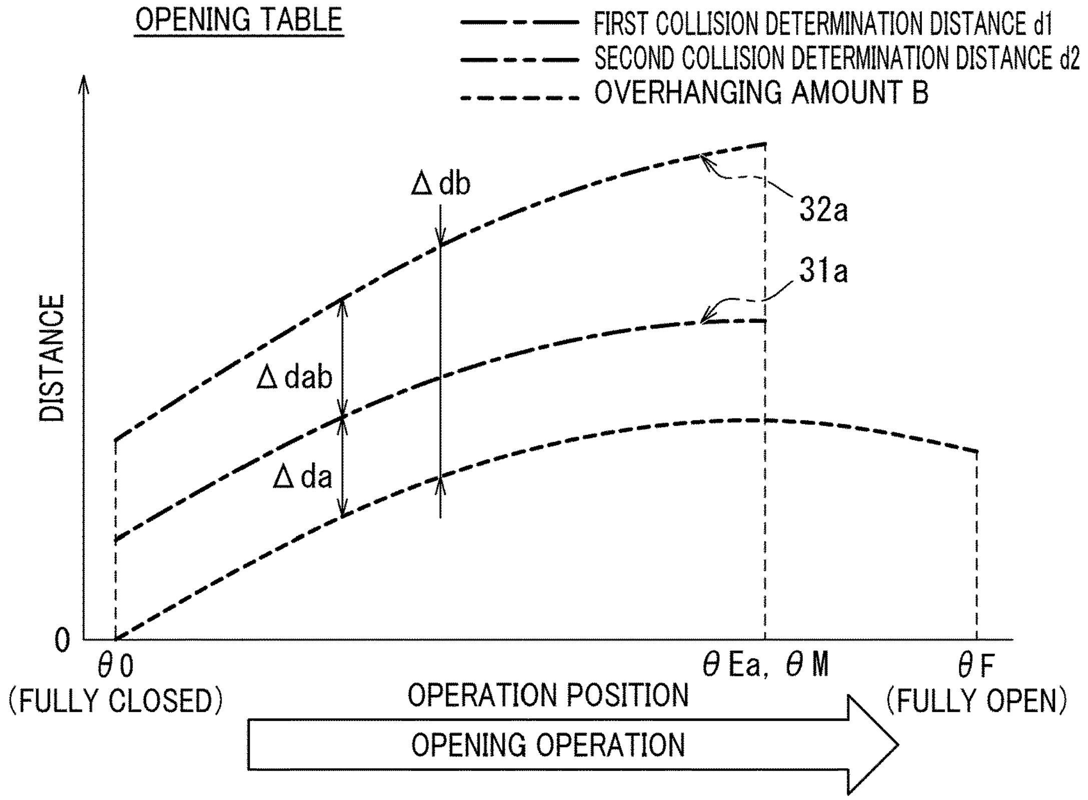
FIG. 7 is a graph explaining a table for setting a collision determination distance during opening operation.

FIG. 7 is a graph schematically illustrating a correspondence relationship defined in each of the opening first table **31*a* and the opening second table 32*a* in a two-dimensional orthogonal coordinate system. The horizontal axis represents an operation position, and the vertical axis represents the collision determination distance d. A value of an operation position increases toward the right side in a horizontal axis direction, and as a releasing operation progresses, an operation position and the collision determination distance d shift from the left side to the right side on a diagram. FIG. 7 also illustrates a diagram illustrating the overhanging amount B with respect to an operation position together with the tables 31*a* and 32*a***. Note that the unit of the overhanging amount B is the same as the unit of the collision determination distance d (for example, mm), and a difference between the overhanging amount B and the collision determination distance d is represented by a difference between vertical axis coordinates.

While the collision determination distance d is used during execution of the collision prevention processing and is set on the basis of an operation position, an end condition of the collision prevention processing is defined by an operation position. Therefore, unless otherwise specified, in description regarding the collision determination distance d applied at the time of the opening operation, an operation position on the opening direction side (right side in the horizontal axis direction in FIG. 7) from the opening end position θEa in a movable range of the back door 4 is ignored. As a specific example, unless otherwise specified, operation positions identified by the term "as an operation position is closer to the maximum overhanging position θM" do not include an operation position from the opening end position θEa to the fully open position θF. In the present embodiment, since the opening end position θEa is the maximum overhanging position θM, operation positions identified by the term do not include an operation position from the maximum overhanging position θM as the opening end position θEa to the fully open position θF.

As an operation position approaches the maximum overhanging position θM from the fully closed position θ0, the overhanging amount B increases. In response to this, as an operation position is closer to the maximum overhanging position θM, the collision determination distance d is larger.

A difference Δda between the first collision determination distance d1 and an overhanging amount is substantially constant regardless of an operation position. That is, an increase in the first collision determination distance d1 corresponds to an increase in the overhanging amount B. In other words, in a case where the distance sensor 41 is attached to the back door 4 and a start point of the detection distance dX is displaced according to an operation position, the first collision determination distance d1 is substantially constant regardless of an operation position. Note that "substantially constant" includes not only a case where the difference Δda is a constant value regardless of an operation position, but also a case where the difference Δda slightly changes depending on an operation position.

On the other hand, a difference Δdb between the second collision determination distance d2 and the overhanging amount B is larger as an operation position is closer to the maximum overhanging position θM. Since the difference Δda is substantially constant regardless of an operation position, an excess amount Δdab of the second collision determination distance d2 with respect to the first collision determination distance d1 is larger as an operation position is closer to the maximum overhanging position θM.

The difference Δdb is set on the basis of a moving speed assumed for the detected object X as a moving object, an operation speed of the back door 4 at each operation position, and time (hereinafter, time required for stopping) or an operation amount of the back door 4 within the time required for stopping. The time required for stopping is a time required from start of braking of the electric motor 11 and the back door 4 after it is determined in the control unit 20 to stop the electric motor 11, to actual stop of the back door 4. The operation speed is higher as an operation position is away from the fully closed position θ0. As the operation speed is higher, the time required for stopping is longer, and an operation amount within the time required for stopping is larger. As the operation speed is higher and the time required for stopping is longer, the difference Δdb is larger. As a result, the difference Δdb is larger as an operation position is closer to the maximum overhanging position θM.

Figure 8:
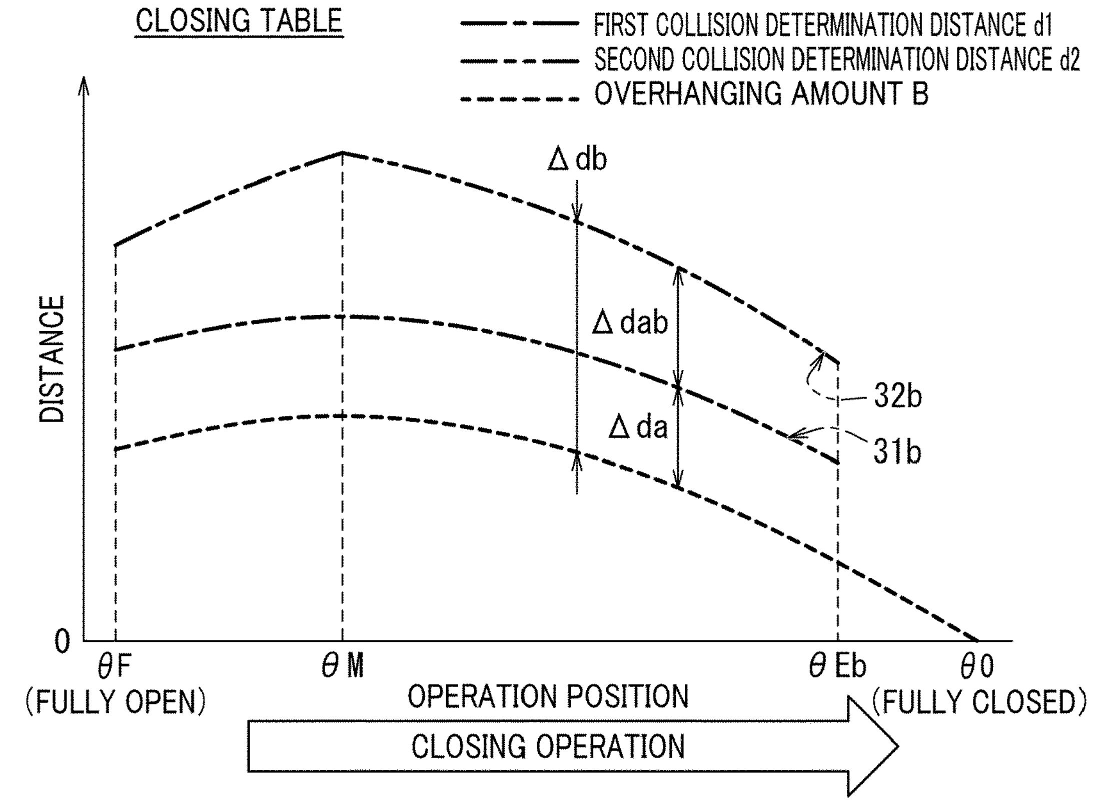
FIG. 8 is a graph explaining a table for setting a collision determination distance during closing operation.

FIG. 8 is a graph schematically illustrating a correspondence relationship defined in each of the closing first table 31*b* and the closing second table 32*b* in a two-dimensional orthogonal coordinate system. Unlike usual, a value of an operation position is smaller toward the right side in the horizontal axis direction. Therefore, as the closing operation progresses, an operation position and the collision determination distance d shift from the left side to the right side of a diagram in the same manner as in FIG. 7. Unless otherwise specified, in description regarding the collision determination distance d applied at the time of the closing operation, an operation position on the closing direction side (right side in the horizontal axis direction in FIG. 8) from the closing end position θEb in a movable range of the back door 4 is ignored.

At the time of the closing operation, an operation position of the back door 4 changes from the fully open position θF to the fully closed position θ0 via the maximum overhanging position θM, and when the operation position reaches the closing end position θEb near the fully closed position θ0, the collision prevention processing ends. Also at the time of the closing operation, as an operation position is closer to the maximum overhanging position θM, the collision determination distance d is larger. Also at the time of the closing operation, the difference Δda between the first collision determination distance d1 and the overhanging amount B is substantially constant regardless of an operation position. Also at the time of the closing operation, as an operation position is closer to the maximum overhanging position θM, the difference Δdb between the second collision determination distance d2 and the overhanging amount B is larger, and the excess amount Δdab of the second collision determination distance d2 with respect to the first collision determination distance d1 is larger.

Hereinafter, a method of controlling the opening operation and the closing operation of the back door 4 executed by the control unit 20 configured as described above will be described with reference to FIGS. 9 and 10.

When the communication unit 24 receives a start command of the opening operation (S1: YES), the drive control unit 23 operates the electric motor 11 to start the opening operation of the back door 4 (Step S3). When the communication unit 24 receives a start command of the closing operation instead of the opening operation (S1: NO AND S2: YES), the drive control unit 23 operates the electric motor 11 in a direction opposite to a direction at the time of the opening operation to start the closing operation of the back door 4 (Step S4). When no start command is input (S1: NO AND S2: NO), the control unit 20 waits for input of a start command in a state where the electric motor 11 is stopped.

When a start command is input (S1: YES OR S2: YES), the distance sensor 41 sequentially detects the detection distance dX, and the communication unit 24 sequentially receives a detection result of the detection (Step S11). Further, the door position calculation unit 25 sequentially calculates an operation position of the back door 4 with reference to an operation position calculation table (not illustrated) stored in the storage unit 21 on the basis of a detection result of the door position sensor 42 sequentially input to the communication unit 24 (Step S12).

Hereinafter, for simplification of description, a case where a start command of the opening operation is input in the fully closed state will be described as an example. The determination unit 26 determines whether operation is completed (that is, whether or not the back door 4 is in the fully open state) (Step S13). A method of determining completion of operation is not particularly limited, but in the present embodiment, a calculation result of the door position calculation unit 25 can be used. In a case where the back door 4 is not in the fully open state (S13: NO), the condition determination unit 26*a* determines whether a start condition of collision prevention processing S20 is satisfied (Step S14).

Figure 6A:
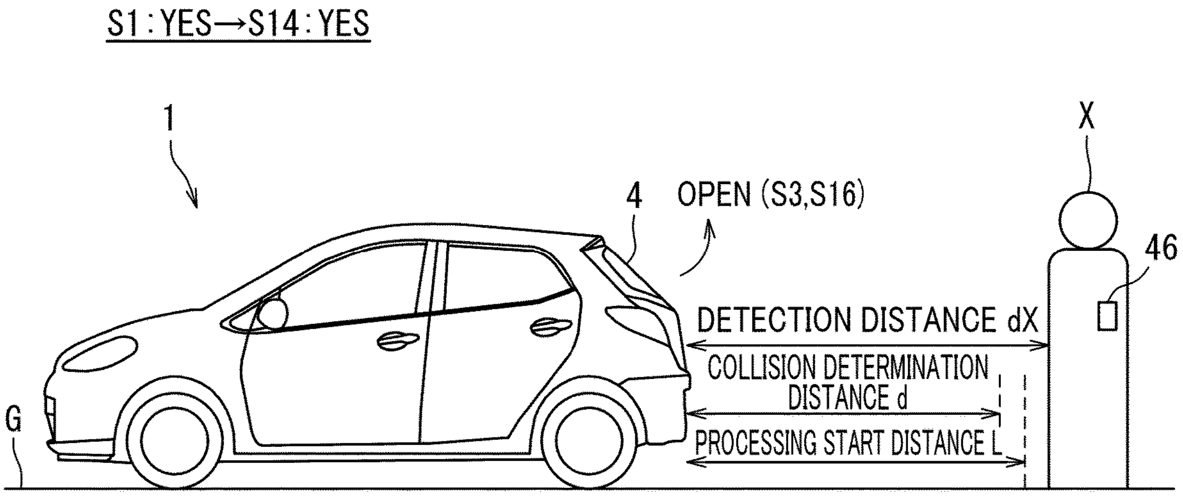
FIG. 6A is a schematic diagram explaining a start condition of collision prevention processing.
Figure 6B:
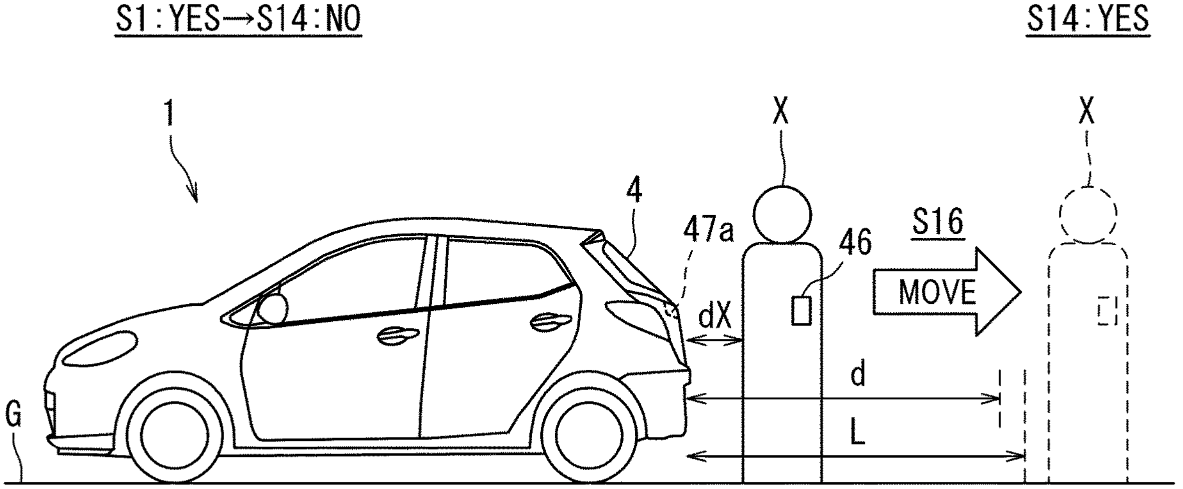
FIG. 6B is a schematic diagram explaining a start condition of the collision prevention processing.

Referring to FIGS. 6A and 6B, a start condition of the collision prevention processing S20 includes a condition that the detection distance dX is larger than a processing start distance L. The processing start distance L is longer than the collision determination distance d. As described above, the collision determination distance d changes according to an operation direction and an operation position of the back door 4, and also changes according to whether or not the detected object X is a moving object. In the present embodiment, the processing start distance L is larger than a maximum value of the collision determination distance d variably set in this manner. As an example, a maximum value of the collision determination distance d is the second collision determination distance d2 when an operation position is the maximum overhanging position θM. In the present embodiment, the processing start distance L is stored in the storage unit 21 as a predetermined constant value.

As illustrated in FIG. 6A, when the user as the detected object X is in a place farther than the processing start distance L from the vehicle body 2 at a time point at which a start command is input (S1: YES), a start condition is satisfied at that time point (S14: YES). As a case where a start condition is satisfied at a time point at which a start command is input, a case where the user operates a button of the electronic key 46 at a position sufficiently away from the vehicle body 2 can be exemplified.

As illustrated in FIG. 6B, when the user as the detected object X is at a place closer than the processing start distance L from the vehicle body 2 at a time point at which a start command is input (S1: YES), a start condition is not satisfied at that time point (S14: NO). As a case where a start condition is not satisfied at a time point at which a start command is input, a case where the user operates the opening switch 47*a* provided on the back door 4 can be exemplified. Even if the collision prevention processing S20 is started under this situation, the opening operation is immediately stopped because the user is close to the vehicle body 2 enough to touch the back door 4. Therefore, under such a situation, the start condition is not satisfied, and the collision prevention processing S20 is not executed. In other words, without shifting to a collision prevention mode, the drive control unit 23 controls the electric motor 11 to continue the opening operation of the back door 4 (Step S16).

However, even after that, the condition determination unit 26*a* continues to monitor whether or not the user as the detected object X moves to a place farther than the processing start distance L from the vehicle body 2 (S14: NO→S11, S14). When the user as the detected object X moves to a place farther than the processing start distance L from the vehicle body 2, a start condition is satisfied at that time point (S14: YES).

When the start condition of the collision prevention processing S20 is satisfied (S14: YES), the condition determination unit 26*a* determines whether or not an end condition of the collision prevention processing S20 is satisfied (Step S15). As described above, an end condition at the time of the opening operation includes a condition that an operation position is at the opening end position θEa or further on the opening direction side than the opening end position θEa. Schematically, at a time point at which the start condition is satisfied, the end condition is not satisfied (S15: NO), and thus, the collision prevention processing S20 is started.

In the collision prevention processing S20, first, the movement determination unit 26*b* determines whether the detected object X is a moving object or a stationary object based on a detection result of the distance sensor 41 sequentially input to the communication unit 24 (time-series data of the detection distance dX stored in the storage unit 21) (Step S21).

In a case where the detected object X is a stationary object (S21: NO), the setting unit 27 refers to the opening first table 31*a* stored in the storage unit 21, and sets the first collision determination distance d1 as the collision determination distance d based on a current value of an operation position of the back door 4 calculated in Step S12 immediately before (Step S22).

In a case where the detected object X is a moving object (S21: YES), the setting unit 27 refers to the opening second table 32*a* stored in the storage unit 21, and sets the second collision determination distance d2 as the collision determination distance d based on a current value of an operation position of the back door 4 calculated in Step S12 immediately before (Step S23).

Next, the stop determination unit 26*c* compares the detection distance dX detected in Step S11 immediately before with the collision determination distance d set in the latest Step S22 or Step S23 (Step S24).

In a case where the detection distance dX is equal to or more than the collision determination distance d (S24: NO), the possibility of collision is low. The drive control unit 23 controls the electric motor 11 to continue the opening operation of the back door 4 (Step S16). The processing is repeated from Step S11. The start condition is satisfied, and the processing proceeds from Step S14 to Step S15. When the detection distance dX continues to be equal to or more than the collision determination distance d and the opening operation continues, an operation position of the back door 4 reaches the opening end position θEa. By the above, the end condition is satisfied (S15: YES), and the collision prevention processing ends. That is, the drive control unit 23 is executed until the opening operation of the back door 4 is in the fully open state regardless of the detection distance dX (Step S17). When the back door 4 is in the fully open state, the processing ends.

On the other hand, in a case where the detection distance dX is less than the collision determination distance d in a state where the end condition is not satisfied (that is, in a state where an operation position has not reached the opening end position θEa) (S24: YES), a collision between the back door 4 and the detected object X may occur. The drive control unit 23 controls the electric motor 11 to stop the opening operation of the back door 4 (Step S25). The electric motor 11 is braked, so that an operation speed of the back door 4 is rapidly reduced. When the electric motor 11 and the opening operation of the back door 4 are completely stopped, the processing ends.

The above similarly applies to a case where a start command of the closing operation is input in the fully open state. The determination unit 26 determines whether or not the operation is completed, that is, whether or not the back door 4 is in the fully closed state (Step S13). If the back door 4 is in the fully closed state (S13: YES), the drive control unit 23 stops the electric motor 11, and the processing ends. If the back door 4 is not in the fully closed state (S13: NO), whether or not the start condition is satisfied is determined (Step S14). After the start condition is satisfied, the collision prevention processing S20 is executed until the end condition is satisfied (S14: YES AND S15: NO). In the collision prevention processing S20, it is determined whether the detected object X is a moving object or a stationary object (Step S21).

When the detected object X is a stationary object (S21: NO), the setting unit 27 refers to the closing first table 31*b* stored in the storage unit 21, and sets the first collision determination distance d1 as the collision determination distance d based on a current value of an operation position of the back door 4 calculated in Step S12 immediately before (Step S22). When the detected object X is a moving object (S21: YES), the setting unit 27 refers to the closing second table 32*b* stored in the storage unit 21, and sets the second collision determination distance d2 as the collision determination distance d based on a current value of an operation position of the back door 4 calculated in Step S12 immediately before (Step S23).

Next, the stop determination unit 26*c* compares the detection distance dX detected in Step S11 immediately before with the collision determination distance d set in the latest Step S22 or Step S23 (Step S24). If the detection distance dX is equal to or more than the collision determination distance d (S24: NO), the closing operation of the back door 4 is continued (Step S16). When the closing operation is continued until an operation position of the back door 4 reaches the closing end position θEb, the end condition is satisfied (S15: YES). The collision prevention processing S20 ends, and the closing operation of the back door 4 is executed until the back door 4 is in the fully closed state (Step S17). When the back door 4 is in the fully closed state, the processing ends.

On the other hand, in a case where the detection distance dX is less than the collision determination distance d in a state where the end condition is not satisfied (that is, the operation position has not reached the closing end position θEb) (S24: YES), the drive control unit 23 controls the electric motor 11 to stop the closing operation of the back door 4 (Step S25). The electric motor 11 is braked, so that an operation speed of the back door 4 is rapidly reduced. When the electric motor 11 and the closing operation of the back door 4 are completely stopped, the processing ends.

Note that, when a start command of the opening operation is input after the opening operation or the closing operation of the back door 4 is stopped halfway by the collision prevention processing S20, the processing starts from Step S3. When a start command of the closing operation is input, the processing starts from Step S4. As described above, even not in a case where the opening operation is started from the fully closed state or not in a case where the closing operation is started from the fully open state, whether the start condition is satisfied is determined in the same manner as described above (Step S14), and after the start condition is satisfied, until the end condition is satisfied (S14: YES AND S15: NO), the collision prevention processing S20 is executed.

When operation of the back door 4 is stopped by the collision prevention processing S20 immediately after the opening operation is performed from the fully closed state, an operation position of the back door 4 may not reach the closing end position θEb. After the above, in a case where a start command of the closing operation is input, the end condition is already satisfied at the time of input of the start command. Even if the start condition is satisfied at a time point of input of a start command, the end condition is also simultaneously satisfied (S14: YES AND S15: YES), and the back door 4 is closed without execution of the collision prevention processing S20 (Step S17). The above similarly applies to a case where operation of the back door 4 is stopped by the collision prevention processing S20 immediately after the closing operation is performed from the fully open state, and then a start command of the opening operation is input.

Up to this point, it is assumed that the start condition is satisfied before operation is completed after a start command is input. However, even in a case where the opening operation is continued while the start condition is not satisfied (S14: NO→S16), if the back door 4 becomes in the fully open state (S13: YES), the processing is appropriately ended. The above similarly applies to a case where the closing operation continues.

Further, in a case where a start command of the opening operation is input in the fully open state, the back door 4 is already in the fully open state (S13: YES), and thus the processing is immediately and appropriately ended. The above similarly applies to a case where a start command of the closing operation is input in the fully closed state.

According to the above configuration, when the detection distance dX as a distance from the distance sensor 41 to the detected object X is smaller than the collision determination distance d set by the control unit 20, operation of the back door 4 stops. In a case where the detected object X is a stationary object, the control unit 20 sets the first collision determination distance d1 as the collision determination distance d. On the other hand, in a case where the detected object X is a moving object, the control unit 20 sets the second collision determination distance d2 as the collision determination distance d. The second collision determination distance d2 is longer than the first collision determination distance d1. Therefore, in a case where the detected object X is a moving object, operation of the back door 4 stops even if the detected object X is present at a farther position. For this reason, the back door 4 can be stopped before the detected object X is too close to the back door 4, and occurrence of collision of the back door 4 can be prevented even if the detected object X is a moving object.

As an operation position of the back door 4 is closer to the maximum overhanging position θM, the excess amount Δdab of the second collision determination distance d2 with respect to the first collision determination distance d1 is larger. When an operation position of the back door 4 is close to the maximum overhanging position θM, an operation speed of the back door 4 is also high, and the time required for stopping from start of stop of the back door 4 to actual stop of the back door 4 is long. By making the excess amount Δdab large, it is possible to prevent a situation in which a moving object collides with the back door 4 without being stopped in time.

At the time of the opening operation, when an operation position of the back door 4 reaches the opening end position θEa near the fully open position θF, the collision prevention processing S20 ends, and the back door 4 operates to the fully open position θF regardless of the detection distance dX. In a case where the detected object X is a person, it is possible to prevent the back door 4 from stopping in a state where the head of the person collides with the back door 4, and safety is improved. The maximum overhanging position θM is suitable as the opening end position θEa. Since the overhanging amount B decreases, there is a low possibility that collision occurs even if the collision prevention processing S20 ends after that. For this reason, both maintenance of convenience and securing of safety can be achieved.

The above similarly applies to the closing operation. When an operation position of the back door 4 reaches the closing end position θEb near the fully closed position θ0, the collision prevention processing S20 ends, and the back door 4 operates to the fully closed position θ0 regardless of the detection distance dX. In a case where the back door 4 stops in a slightly open state in which the back door 4 is positioned in the vicinity of the fully closed position θ0, there is a possibility that the back door 4 is left in the slightly open state without being noticed by the user. Theft using a gap can be prevented, and safety is improved.

Second Embodiment

Hereinafter, a second embodiment will be described with reference to FIGS. 11 to 12, focusing on a difference from the first embodiment.

Figure 11:
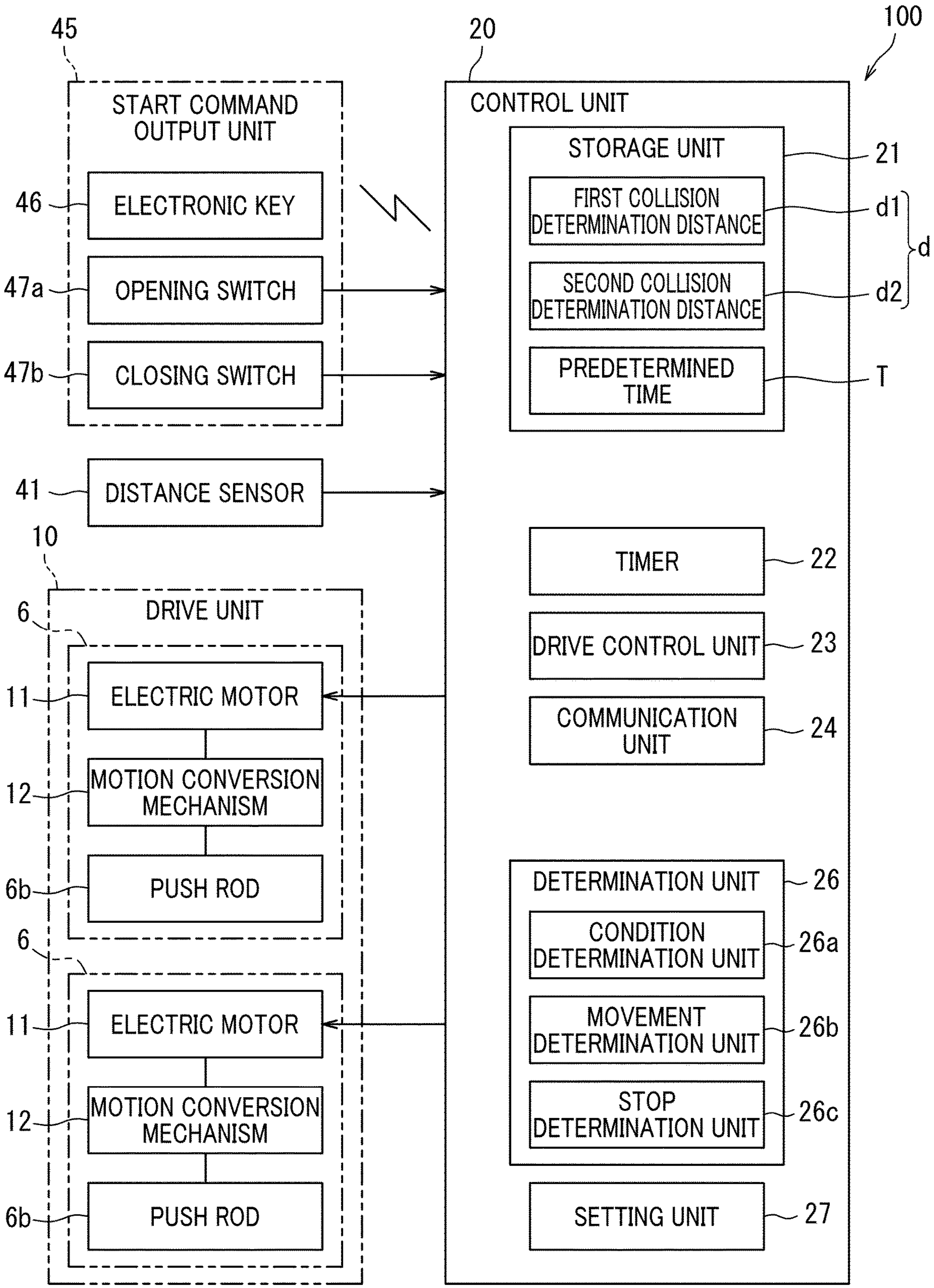
FIG. 11 is a block diagram schematically illustrating a configuration of the opening and closing body control device according to a second embodiment.

Referring to FIG. 11, the opening and closing body control device 100 according to the present embodiment does not include the door position sensor 42. In other words, the control unit 20 cannot acquire information detected by an encoder of the electric motor 11. In view of the above, control executed with reference to an operation position of the back door 4 in the above embodiment is changed as described below.

For example, the tables 31 and 32 (see FIG. 4) are omitted from the storage unit 21. Instead, the storage unit 21 stores the first collision determination distance d1 and the second collision determination distance d2. The setting unit 27 selectively sets one of the first collision determination distance d1 and the second collision determination distance d2 depending on whether the detected object X is a moving object or a stationary object. The first collision determination distance d1 may be different or common between at the time of opening and at the time of closing. The above similarly applies to the second collision determination distance d2. Note that, similarly to the above embodiment, the second collision determination distance d2 is longer than the first collision determination distance d1.

Further, the end condition does not include a condition based on an operation position of the back door 4. Instead, the end condition includes a condition that predetermined time T elapses from a time point at which a start command is input. When a start command is input, the timer 22 measures elapsed time from that time point. The condition determination unit 26*a* determines whether or not measured elapsed time reaches the predetermined time T. The predetermined time T is shorter than required time for operation of the back door 4 between the fully closed position θ0 and the fully open position θF, and is stored in advance in the storage unit 21. The required time can be assumed in advance in a design stage of the back door 4 and the drive unit 10.

Figure 9:
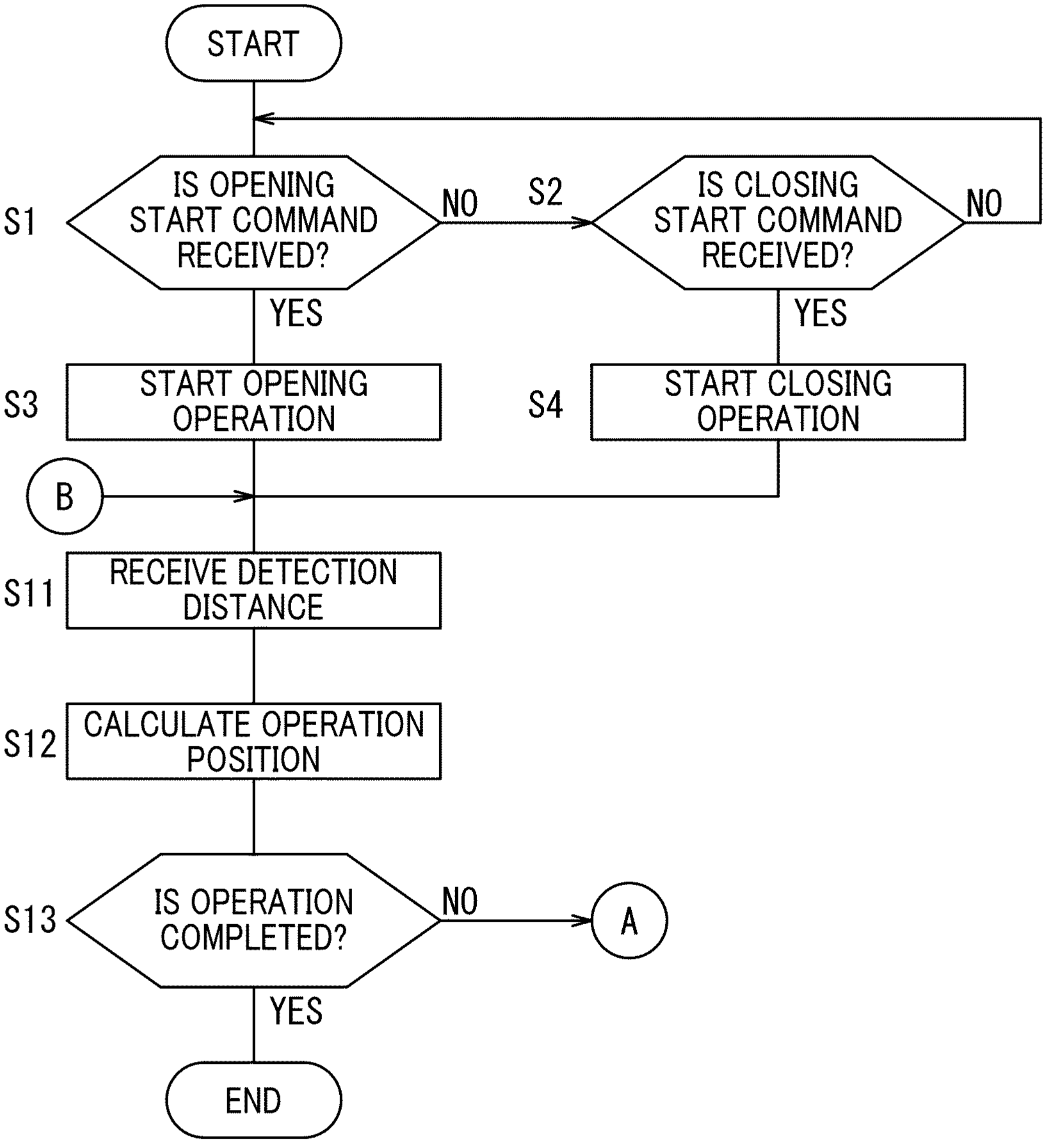
FIG. 9 is a flowchart illustrating a part of processing executed by the opening and closing body control device illustrated in FIG. 4.
Figure 10:
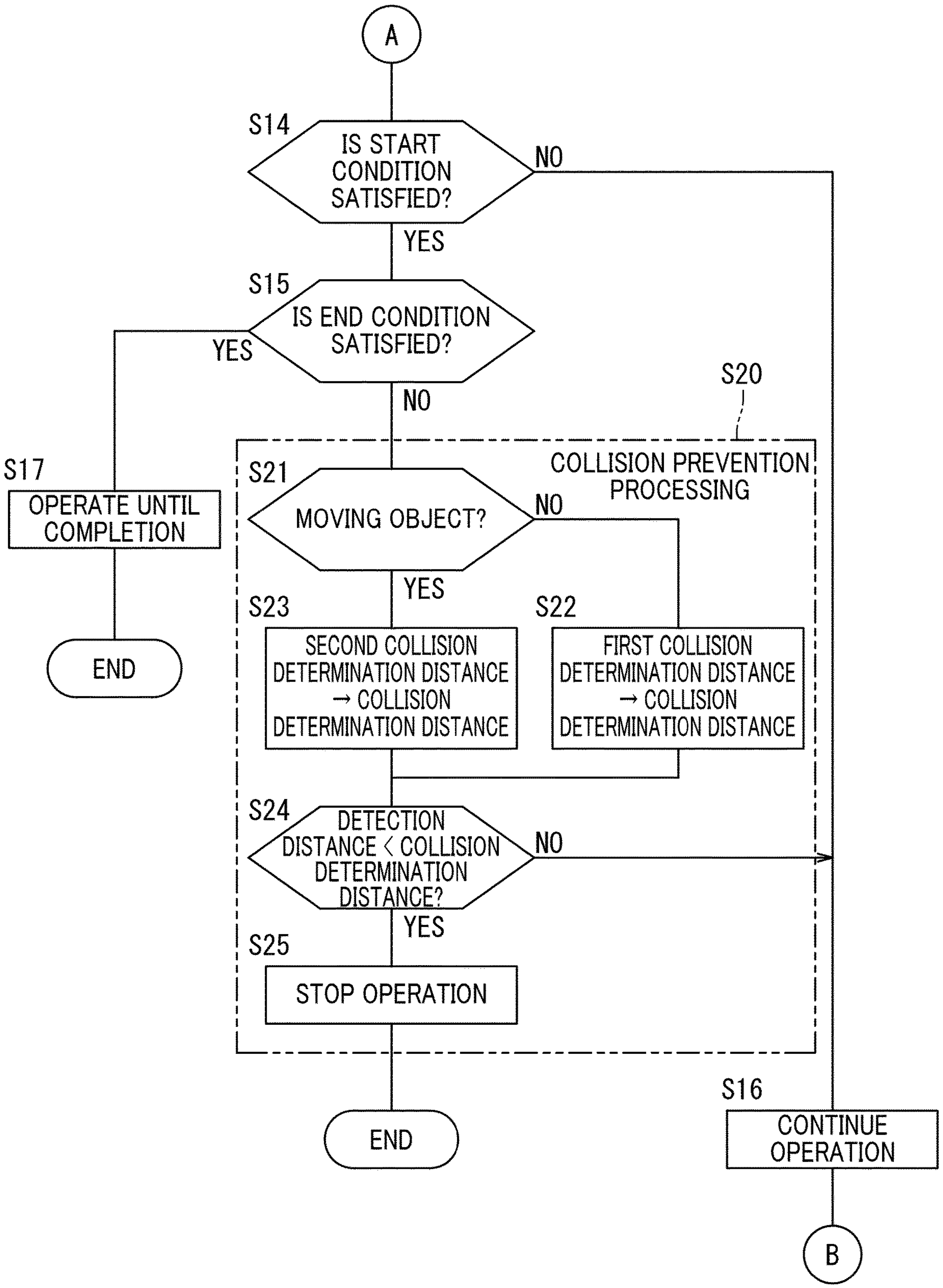
FIG. 10 is a flowchart illustrating a part of processing executed by the opening and closing body control device illustrated in FIG. 4.
Figure 12:
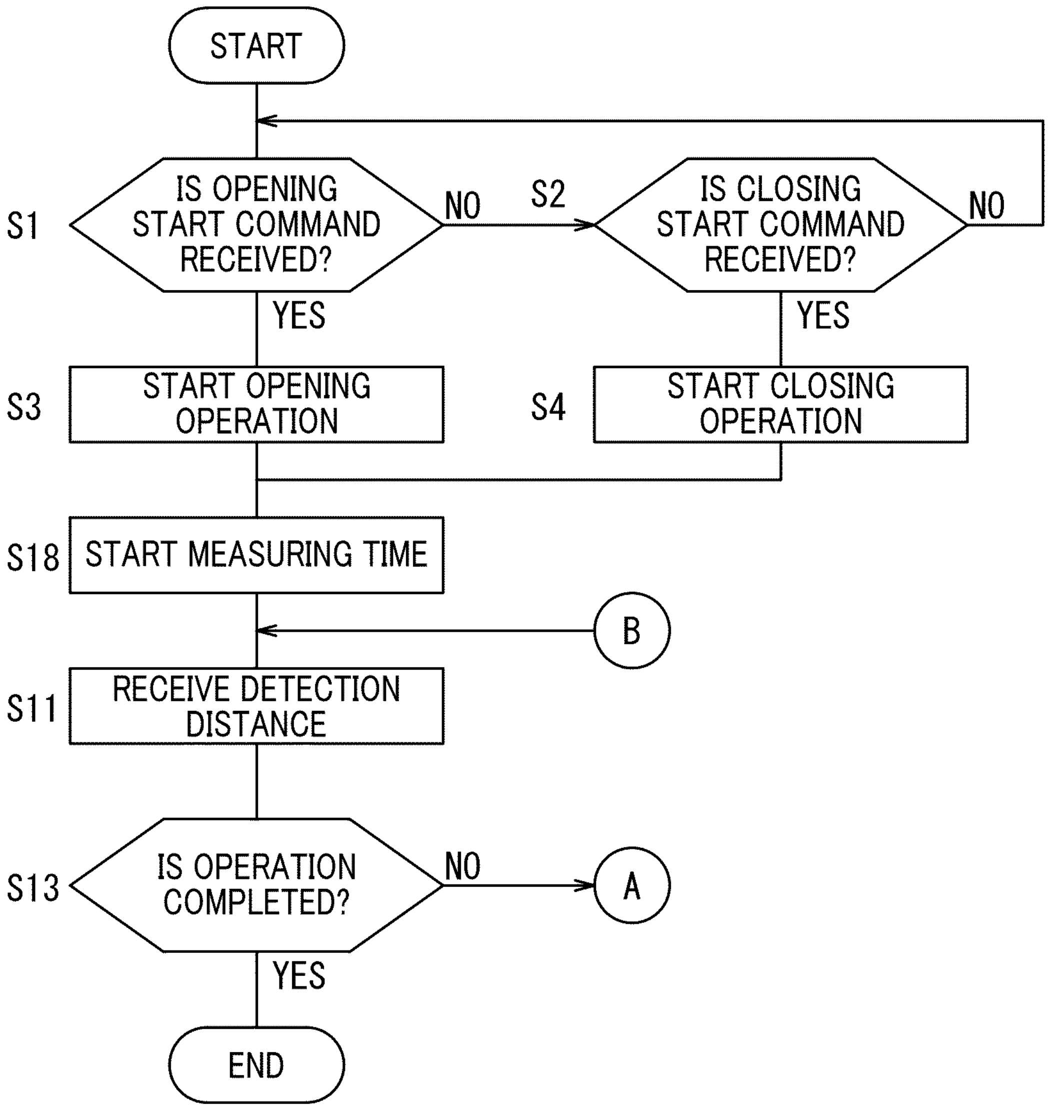
FIG. 12 is a flowchart illustrating a part of processing executed by the opening and closing body control device illustrated in FIG. 11.

FIG. 12 corresponds to FIG. 9 illustrating the first embodiment, and an encircled alphabet in FIG. 12 corresponds to an encircled alphabet in FIG. 10. Referring to FIGS. 12 and 10, when a start command is input, the detection distance dX is sequentially received similarly to the first embodiment (Step S11), and the operation position calculation step S12 (see FIG. 9) is omitted. Instead, the timer 22 starts measuring elapsed time from a time point of input of a start command (Step S18).

Next, similarly to the first embodiment, the determination unit 26 determines whether or not operation is completed (Step S13). A method for determining completion of operation is not particularly limited, but in the present embodiment, the determination can be made based on whether or not elapsed time measured by the timer 22 reaches required time for operation of the back door 4 between the fully closed position θ0 and the fully open position θF. Note that, similarly, at the time of the closing operation, completion of operation may be determined based on whether or not the required time is reached, or completion of operation may be determined based on a state of a latch mechanism provided in the back door 4. When the operation is not completed (S13: NO), the condition determination unit 26*a* determines whether the start condition of the collision prevention processing S20 is satisfied (Step S14). When the operation is completed without satisfying the start condition (S14: NO→S13: YES), the processing ends. When the start condition is satisfied (S14: YES), the condition determination unit 26*a* refers to a measurement value of the timer 22 and determines whether or not the end condition of the collision prevention processing S20 is satisfied (Step S15). The start condition is the same as that in the above embodiment. Unlike the above embodiment, the end condition is a condition that the predetermined time T elapses from a time point at which a start command is input. When the end condition is not satisfied (S15: NO), the collision prevention processing S20 is executed.

A process of the collision prevention processing S20 is similar to that of the above embodiment. The movement determination unit 26*b* determines whether the detected object X is a moving object or a stationary object (Step S21). In a case where the detected object X is a stationary object (S21: NO), the setting unit 27 sets the first collision determination distance d1 stored in the storage unit 21 as the collision determination distance d (Step S22). When the detected object X is a moving object (S21: YES), the setting unit 27 sets the second collision determination distance d2 stored in the storage unit 21 as the collision determination distance d (Step S23). In this manner, a predetermined value is set as the collision determination distance d without using a table. Next, the stop determination unit 26*c* compares the detection distance dX detected in Step S11 immediately before with the collision determination distance d (Step S24). In a case where the detection distance dX is equal to or more than the collision determination distance d (S24: NO), operation of the back door 4 is continued (Step S16), and the processing is repeated from Step S11. When the end condition is satisfied (S15: YES), the collision prevention processing S20 ends, and operation of the back door 4 is executed until completion (Step S17). In a case where the detection distance dX is less than the collision determination distance d (S24: YES), operation of the back door 4 is stopped (Step S25). When operation of the electric motor 11 and thus operation of the back door 4 are completely stopped, the processing ends.

As described above, even in a configuration in which the opening and closing body control device 100 does not include the door position sensor 42 and an operation position of the back door 4 cannot be referred to, the control unit 20 sets the collision determination distance d according to a determination result as to whether the detected object X is a moving object or a stationary object. Also in this case, the collision prevention processing S20 during the opening operation ends immediately before the fully open state, and the collision prevention processing S20 during the closing operation ends immediately before the fully closed state. By the above, it is possible to achieve both securing of safety and maintenance of convenience, similarly to the above embodiment.

Variation

Although the embodiment of the present invention is described above, the above configuration can be appropriately added, changed, or deleted within the scope of the gist of the present invention.

In the first embodiment, different tables are used at the time of opening and at the time of closing, but the tables may be common between at the time of opening and at the time of closing.

In the second embodiment, the first collision determination distance d1 and the second collision determination distance d2 are set to predetermined values, but the first collision determination distance d1 may be variably set according to elapsed time from a time point of input of a start command. Such variable setting can be realized by replacing an operation position with elapsed time for the horizontal axis of the first table 31 in the first embodiment. The above similarly applies to the second collision determination distance d2.

The distance sensor 41 may be attached to the back door 4. The opening and closing body is not limited to a back door, and may be, for example, a side door or a trunk lid. Operation of the opening and closing body is not limited to rotation around an axis in the vehicle width direction, and may be rotation around an axis in a vertical direction or slide movement along a side surface of a vehicle body. The opening and closing body control device 100 is also applicable to a vehicle other than a four-wheeled automobile.

What is claimed is:

1. An opening and closing body control device, comprising:

a drive unit that drives an opening and closing body that opens and closes an opening of a vehicle body;

a distance detection unit that detects a detection distance that is a distance to a detected object around the opening and closing body; and a control unit that controls the drive unit to operate the opening and closing body when a start command of opening operation or closing operation of the opening and closing body is input, the control unit configured to:

determine whether the detected object is a moving object or a stationary object based on a detection result of the distance detection unit when the start command is input;

set a first collision determination distance as a collision determination distance to be compared with the detection distance in a case where the detected object is the stationary object;

set a second collision determination distance longer than the first collision determination distance as the collision determination distance in a case where the detected object is the moving object; and control the drive unit to continue operation of the opening and closing body when the detection distance is larger than the collision determination distance, and control the drive unit to stop operation of the opening and closing body when the detection distance is smaller than the collision determination distance, wherein the control unit includes a storage unit that stores in advance a first table defining a correspondence relationship between an operation position of the opening and closing body and the first collision determination distance and a second table defining a correspondence relationship between the operation position and the second collision determination distance, and the control unit is further configured to:

set the first collision determination distance according to the operation position with reference to the first table in a case where the detected object is the stationary object; and set the second collision determination distance according to the operation position with reference to the second table in a case where the detected object is the moving object, wherein the opening and closing body control device further comprises an opening and closing body position detection unit that detects the operation position of the opening and closing body, wherein the control unit sets the collision determination distance such that an excess amount of the second collision determination distance with respect to the first collision determination distance becomes larger as the operation position of the opening and closing body is closer to a maximum overhanging position where an overhanging amount of the opening and closing body from the vehicle body is at a maximum within a movable range of the opening and closing body.

2. The opening and closing body control device according to claim 1, wherein the control unit sets the collision determination distance such that the collision determination distance becomes larger as the operation position of the opening and closing body is closer to the maximum overhanging position.

3. The opening and closing body control device according to claim 2, wherein in a case where the detected object is the stationary object, the control unit sets the first collision determination distance by varying the first collision determination distance according to the overhanging amount and making a difference between the overhanging amount and the first collision determination distance constant.

4. The opening and closing body control device according to claim 2, wherein the control unit determines whether or not a start condition of collision prevention processing of stopping operation of the opening and closing body according to the detection distance is satisfied when the start command is input, and when the start condition is satisfied, executes control of the drive unit based on a comparison result between the detection distance and the collision determination distance.

5. The opening and closing body control device according to claim 1, wherein the first or second table includes:

an opening table that is referred to when the start command of the opening operation is input; and a closing table that is referred to when the start command of the closing operation is input.

6. The opening and closing body control device according to claim 5, wherein the control unit determines whether or not a start condition of collision prevention processing of stopping operation of the opening and closing body according to the detection distance is satisfied when the start command is input, and when the start condition is satisfied, executes control of the drive unit based on a comparison result between the detection distance and the collision determination distance.

7. The opening and closing body control device according to claim 1, wherein the control unit determines whether or not a start condition of collision prevention processing of stopping operation of the opening and closing body according to the detection distance is satisfied when the start command is input, and when the start condition is satisfied, executes control of the drive unit based on a comparison result between the detection distance and the collision determination distance.

8. The opening and closing body control device according to claim 7, wherein the control unit determines whether or not an end condition of the collision prevention processing is satisfied when the start condition is satisfied, the end condition includes a condition that an operation position of the opening and closing body reaches a predetermined end position, or a condition that predetermined time elapses after the start command is input, and the end position is set between a fully closed position and a fully open position, and the predetermined time is shorter than required time for operation of the opening and closing body between the fully closed position and the fully open position.

9. The opening and closing body control device according to claim 7, wherein the start condition includes a condition that the detection distance is larger than a processing start distance longer than the collision determination distance.

10. The opening and closing body control device according to claim 9, wherein the control unit determines whether or not an end condition of the collision prevention processing is satisfied when the start condition is satisfied, the end condition includes a condition that an operation position of the opening and closing body reaches a predetermined end position, or a condition that predetermined time elapses after the start command is input, and the end position is set between a fully closed position and a fully open position, and the predetermined time is shorter than required time for operation of the opening and closing body between the fully closed position and the fully open position.

11. The opening and closing body control device according to claim 9, wherein in a case where the detection distance is smaller than the processing start distance at a time point of input of the start command, when the detection distance becomes larger than the processing start distance thereafter, the start condition is satisfied.

12. The opening and closing body control device according to claim 11, wherein the control unit determines whether or not an end condition of the collision prevention processing is satisfied when the start condition is satisfied, the end condition includes a condition that an operation position of the opening and closing body reaches a predetermined end position, or a condition that predetermined time elapses after the start command is input, and the end position is set between a fully closed position and a fully open position, and the predetermined time is shorter than required time for operation of the opening and closing body between the fully closed position and the fully open position.

13. The opening and closing body control device according to claim 1, further comprising an opening and closing body position detection unit that detects a parameter available for deriving or estimating the operation position, wherein the storage unit stores in advance an operation position calculation table that defines a correlation between the parameter to be detected by the opening and closing body position detection unit and the operation position of the opening and closing body, and the control unit is further configured to calculate the operation position of the opening and closing body on the basis of a detection result of the opening and closing body position detection unit, referring to the operation position calculation table.

14. An opening and closing body control device, comprising:

a drive unit that drives an opening and closing body that opens and closes an opening of a vehicle body;

a distance detection unit that detects a detection distance that is a distance to a detected object around the opening and closing body; and a control unit that controls the drive unit to operate the opening and closing body when a start command of opening operation or closing operation of the opening and closing body is input, the control unit configured to:

determine whether the detected object is a moving object or a stationary object based on a detection result of the distance detection unit when the start command is input;

set a first collision determination distance as a collision determination distance to be compared with the detection distance in a case where the detected object is the stationary object;

set a second collision determination distance longer than the first collision determination distance as the collision determination distance in a case where the detected object is the moving object; and control the drive unit to continue operation of the opening and closing body when the detection distance is larger than the collision determination distance, and control the drive unit to stop operation of the opening and closing body when the detection distance is smaller than the collision determination distance, wherein the opening and closing body control device further comprises an opening and closing body position detection unit that detects the operation position of the opening and closing body, wherein the control unit sets the collision determination distance such that an excess amount of the second collision determination distance with respect to the first collision determination distance becomes larger as the operation position of the opening and closing body is closer to a maximum overhanging position where an overhanging amount of the opening and closing body from the vehicle body is maximum within a movable range of the opening and closing body.

* * * * *